United States Patent
Lindoff et al.

(10) Patent No.: US 8,886,197 B2
(45) Date of Patent: Nov. 11, 2014

(54) HANDOVER MEASUREMENTS TRANSMISSION DEPENDING ON HANDOVER PROBABILITY

(75) Inventors: Bengt Lindoff, Bjärred (SE); Konstantinos Dimou, Stockholm (SE); Walter Müller, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 71 days.

(21) Appl. No.: 13/695,300

(22) PCT Filed: Apr. 1, 2011

(86) PCT No.: PCT/EP2011/055070
§ 371 (c)(1),
(2), (4) Date: Nov. 2, 2012

(87) PCT Pub. No.: WO2011/141230
PCT Pub. Date: Nov. 17, 2011

(65) Prior Publication Data
US 2013/0053025 A1     Feb. 28, 2013

Related U.S. Application Data

(60) Provisional application No. 61/350,085, filed on Jun. 1, 2010.

(30) Foreign Application Priority Data

May 11, 2010 (EP) ..................................... 10162597

(51) Int. Cl.
*H04W 36/00* (2009.01)
*H04W 4/00* (2009.01)
*H04W 36/32* (2009.01)

(52) U.S. Cl.
CPC .......... *H04W 36/0088* (2013.01); *H04W 36/32* (2013.01)
USPC .......................................... 455/437; 370/331

(58) Field of Classification Search
CPC ..... H04W 36/24; H04W 36/30; H04W 36/32; H04W 36/36
USPC .................................... 455/436, 437; 370/331
See application file for complete search history.

(56) References Cited

U.S. PATENT DOCUMENTS

2006/0135150 A1* 6/2006 Oh ................................ 455/425
2006/0281463 A1* 12/2006 Yang ............................. 455/442

(Continued)

FOREIGN PATENT DOCUMENTS

WO     2009116908 A1     9/2009

OTHER PUBLICATIONS

3rd Generation Partnership Project. 3GPP TS 36.331 V9.4.0 (Sep. 2010). 3rd Generation Partnership Project; Technical Specification Group Radio Access Network; Evolved Universal Terrestrial Radio Access (E-UTRA); Radio Resource Control (RRC); Protocol specification (Release 9). Sep. 2010.

(Continued)

*Primary Examiner* — Christopher M Brandt
(74) *Attorney, Agent, or Firm* — Murphy, Bilak & Homiller, PLLC

(57) ABSTRACT

A method of decreasing radio link failure in challenging mobility scenarios for a user equipment (UE), device working in a cellular telecommunication network with a base station of each cell is disclosed. The method comprises measuring signal conditions for serving cell and neighboring cells periodically; and estimating channel variations and comparing the estimate with a threshold value such that, when channel variations are determined to exceed a channel variations threshold, performing an accelerated procedure comprising predicting whether handover is likely to occur in connection with the next scheduled measurement instant based on the signal measurements such that when handover is predicted, the procedure directly proceeds with sending an initial measurement report transmission request. Thereby handover delay can be reduced such that risk of radio link failure is reduced at significantly varying signal conditions. A UE device and a computer program are also disclosed.

15 Claims, 6 Drawing Sheets

(56) References Cited

U.S. PATENT DOCUMENTS

| | | | |
|---|---|---|---|
| 2008/0014934 A1* | 1/2008 | Balasubramanian et al. | 455/434 |
| 2008/0019320 A1* | 1/2008 | Phan et al. | 370/331 |
| 2008/0225801 A1* | 9/2008 | Turk | 370/332 |
| 2008/0232326 A1 | 9/2008 | Lindoff et al. | |
| 2008/0233958 A1* | 9/2008 | Robbins et al. | 455/436 |
| 2008/0279154 A1* | 11/2008 | Palmer et al. | 370/333 |
| 2009/0247162 A1* | 10/2009 | Yasuoka et al. | 455/436 |
| 2010/0113023 A1* | 5/2010 | Huang et al. | 455/436 |
| 2012/0269172 A1* | 10/2012 | Chin et al. | 370/332 |

OTHER PUBLICATIONS

3rd Generation Partnership Project. "Set of Proposed RAN4 Parameters to be Used in Mobility Study." 3GPP TSG-RAN WG4 #50bis, R4-091286, Seoul, Korea, Mar. 23-27, 2009.

3rd Generation Partnership Project. "Speed Dependent Scaling." 3GPP TSG-RAN WG2 Meeting #65bis, R2-092181, Seoul, Korea, Mar. 23-27, 2009.

* cited by examiner

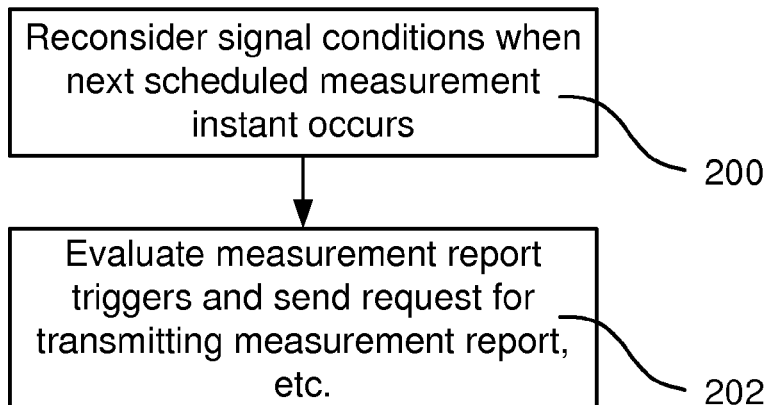
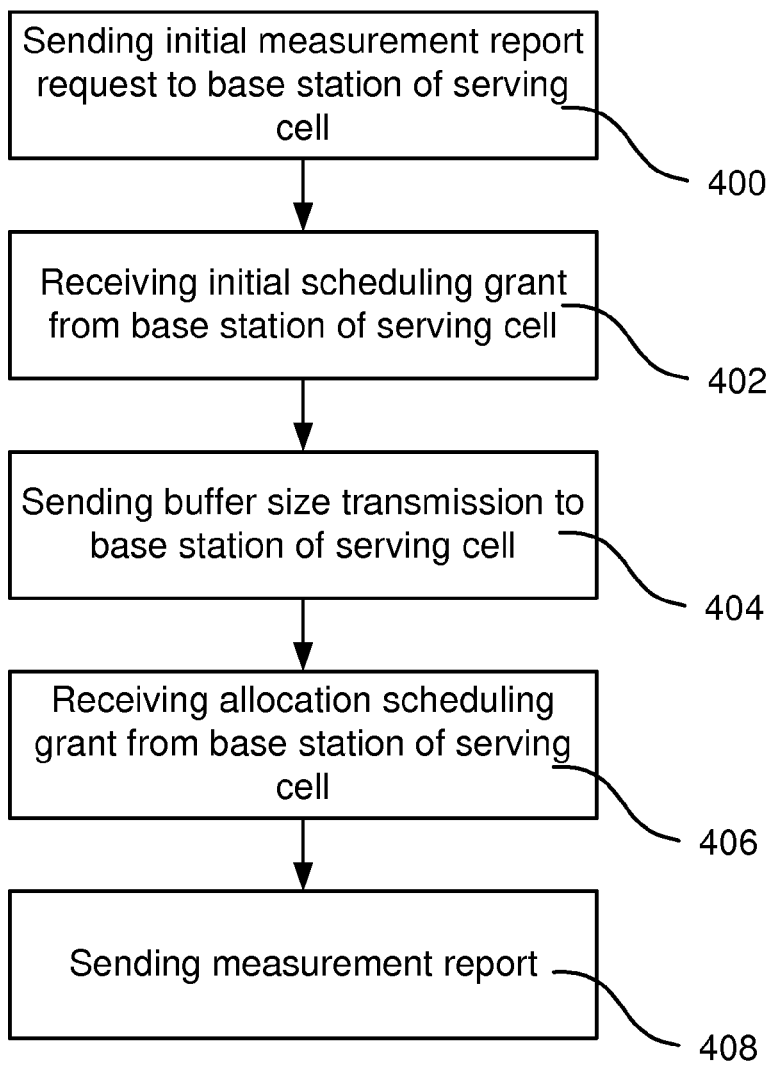

HANDOVER MEASUREMENTS TRANSMISSION DEPENDING ON HANDOVER PROBABILITY

TECHNICAL FIELD

The present invention generally relates to a method of decreasing radio link failure in challenging mobility scenarios for a user equipment, UE, device working in a cellular telecommunication network with a base station of each cell, to such a UE, and to a computer program for implementing the method.

BACKGROUND

For cellular telecommunication network with a base station of each cell, for example a 3GPP LTE network, radio link failure (RLF) performance as well as handover performance is evaluated in challenging mobility scenarios, i.e. where channel variations can be significant. In particular, scenarios where handover failures occur, i.e. the handover signalling is not transmitted with the desired success rate, is a cumbersome task. A challenging scenario involving users moving at high speed is the so called "high speed train scenario". This scenario involves users travelling with a speed of 350 km/h in heavily loaded networks consisting of large cells. In such a scenario, the signal environment may change quickly, and the normal process for performing handover, maybe for a multitude of users more or less simultaneously, may not be sufficient. Another challenging scenario is where obstacles in the environment changes channel properties from one position to another close-by position, as for example in downtown areas.

US 2008/0232326 discloses a method and apparatus enabling more opportune handover. This is performed by sending handover measurement information from mobile stations in conjunction with sending uplink scheduling requests, and by correspondingly making combined handover and resource scheduling decisions. The combined determination provides for timely handover of the mobile station, such as where the mobile station is operating near a cell edge and issues an uplink scheduling request to its currently serving cell.

WO 2009/116908 discloses scheduling of uplink measurement reports, where the scheduling is based on an estimated time of when a measurement report will be ready for transmission. This reduces delay since the scheduling is adapted to a time when a first quality measurement report will be available for transmission from the UE.

The contribution to 3GPP TSG RAN WG4 #50bis in Seoul March 2009 "Set of proposed RAN4 parameters to be used in Mobility study" submitted by Ericsson discloses proposed adaptation of hysteresis for handover based on speed, or of time to trigger values based on speed.

However, for the above described scenario with significantly varying channel, and especially in cells having a high load, there may be a demand for further improvements to ensure proper handover.

SUMMARY

An object of the invention is to at least alleviate the above stated problem. The present invention is based on the understanding that the user equipment (UE) may forecast handover issues since it is able to determine, from the signal conditions, whether it is travelling in high speed or if channel varies significantly, and also is able to estimate likelihood of a soon coming handover. Upon making a forecast where such a handover issue is upcoming, the inventors have realised that the UE can be able to prepare for the situation, and thereby alleviate effects of the issue by reducing handover delay, which decreases the risk of radio link failure.

According to a first aspect, there is provided a method of decreasing radio link failure in challenging mobility scenarios for a UE device working in a cellular telecommunication network with a base station of each cell. The method comprises measuring signal conditions for serving cell and neighbouring cells periodically; and estimating channel variations and comparing the estimate with a threshold value such that, when channel variations are determined to exceed a channel variations threshold, performing an accelerated procedure comprising predicting whether handover is likely to occur when the next scheduled measurement instant occurs based on the signal measurements such that when handover is predicted, the procedure directly proceeds with sending an initial measurement report transmission request. Thereby handover delay can be reduced such that risk of radio link failure is reduced at significantly varying signal conditions.

The method may further comprise, in connection with directly proceeding with sending the initial measurement report request, reconsidering the signal conditions regardless when the next scheduled measurement instant occurs; sending the initial measurement report request to the base station of the serving cell; then receiving an initial scheduling grant from the base station of the serving cell; after reception of the initial scheduling grant, sending a buffer size transmission request to the base station of the serving cell; then receiving an allocation scheduling grant from the base station of the serving cell for the requested size of transmission; and then sending a measurement report based on the reconsidered signal conditions as soon as possible after the next scheduled measurement instant occurs such that the cellular telecommunication network is enabled to make a handover decision for the UE.

The estimating of channel variations may comprise estimating the speed of UE, and the comparing the estimate with a threshold value may comprise comparing the estimated speed of the UE with a threshold speed.

A decision whether to perform the accelerated procedure may further comprise estimating a delay comprising estimated time difference between instant of transmitting initial scheduling request and instant of transmission of measurement report; and comparing the estimated delay with a threshold, wherein the decision is weighted towards a decision to perform the accelerated procedure if the estimated delay exceeds the threshold.

The measuring of the signal conditions for serving cell and neighbouring cells may comprise making cell search and determining Reference Signal Received Power, RSRP, and/or Reference Signal Received Quality, RSRQ, for respective cells.

The predicting of whether handover is likely to occur in connection with the next scheduled measurement instant may comprise determining a likelihood for signal condition for any of the neighbouring cells to further exceed signal condition for serving cell; and determining a threshold for likelihood for signal condition for any of the neighbouring cells to further exceed signal condition for serving cell for handover to be predicted. The determining of the likelihood may comprise making a trend analysis based on previous measurements of signal conditions, and/or decreasing filter constant for collecting signal samples during a period between measurement reports such that a more instant view of channel conditions and variations is achieved.

The method may further comprise predicting signal conditions at least for one future time instant based on collected signal samples, wherein the determining of the likelihood takes the predicted signal conditions into account.

The estimating of channel variations may include any of estimating the speed of the UE by any of determining Doppler shift, and analysing signal strength shifts of fading channel, and analysing signal conditions for abrupt changes during a time window.

According to a second aspect, there is provided a UE device suitable for working in a cellular telecommunication network with a base station of each cell. The UE device comprises a transceiver arranged to receive signals from and transmit signals to at least one of the base stations in vicinity of the UE device when in use; a monitor arranged to measure signal conditions periodically for serving cell and neighbouring cells based on signals received by the transceiver; and a communication controller arranged to, estimate channel variations from the measured signal conditions and compare the estimated channel variations with a threshold value such that, when channel variations is determined to exceed a channel variations threshold, the communication controller perform an accelerated procedure comprising prediction whether handover is likely to occur when the next scheduled measurement instant occurs based on the signal measurements such that when handover is predicted, the procedure directly proceeds with initiating a handover process.

The communication controller, upon the prediction of whether handover is likely to occur in connection with the next scheduled measurement instant, may further be arranged to determine a likelihood for signal condition for any of the neighbouring cells to further exceed signal condition for serving cell, and to determine a threshold for likelihood for signal condition for any of the neighbouring cells to further exceed signal condition for serving cell for handover to be predicted.

The communication controller, upon determination of the likelihood, may further be arranged to perform a trend analysis based on previous measurements of signal conditions and/or to apply a decreased filter constant for collection of signal samples during a period between measurement reports.

According to a third aspect, there is provided a computer program comprising computer program code comprising instructions to cause a processor on which the computer program code is executed to perform the method according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 2 is a flow chart illustrating an embodiment of the first procedure of FIG. 1.

FIG. 4 is a flow chart illustrating an example of the negotiation and sending of measurement report process of FIGS. 2 and 3.

DETAILED DESCRIPTION OF PREFERRED EMBODIMENTS

In the field, the expression "neighbouring cells" means cells in vicinity of the serving cell, wherein a UE being in communication with the serving cell is also able to detect transmissions from the neighbouring cells.

Handover performance as well as RLF performance in the case of high speed train scenario have been assessed. Roughly speaking, whenever RLF during handover occurs, RLF recovery procedure is initiated almost always in the target cell and the procedure is always successful. In the case of high speed train scenario, failures upon transmission of handover signalling can go to values higher than 7.5% in the case of web traffic and up to 12.5% for VoIP traffic. In both cases, RLF recovery procedure is almost always successful. RLF recovery procedure is initiated approximately 75% of the times in the target cell. The rest of the times, RLF procedure is initiated in either the serving or another third cell. 65% of the users will experience interruption shorter than 500 ms, and 90% of the users will have interruption shorter than 600 ms. This interruption time is acceptable for web services, and no Transport Control Protocol, TCP, congestion is expected to be generated. Preparing the target cell and one additional cell would be more than sufficient, even in this case UEs are moving at extremely high speeds of 350 km/h, such as in the high speed train scenario.

Figure 9:
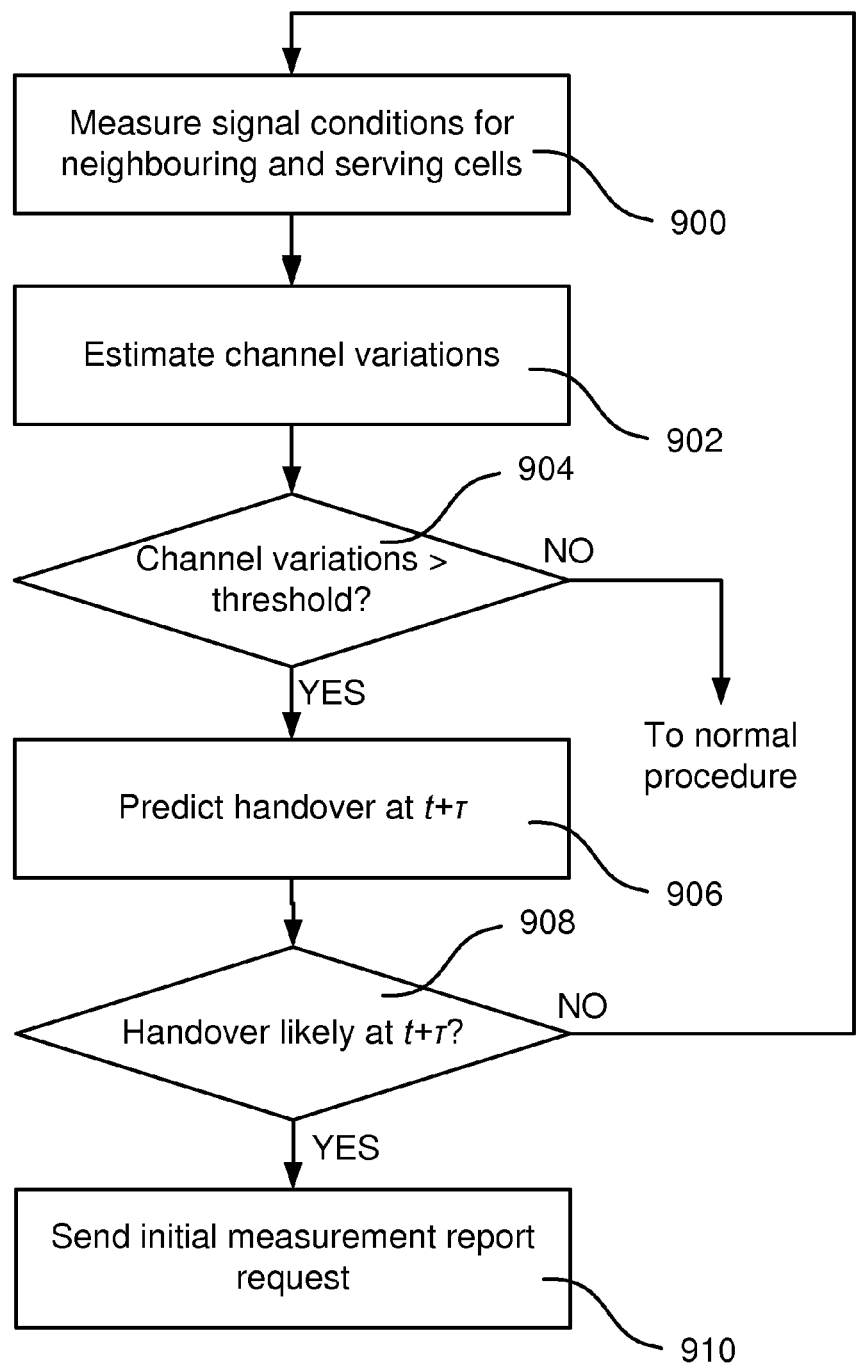
FIG. 9 is a flow chart illustrating a method according to an embodiment.

In brief, the approach is to provide a forecast on upcoming handover such that the UE can be able to prepare for the situation, and thereby, by reducing handover delay, decrease the risk of radio link failure. This is illustrated by flow chart of FIG. 9, where signal conditions for serving cell and neighbouring cells are measured 900 periodically. Channel variations are estimated 902. The channel variations estimate are compared 904 with a threshold value. When channel variations are determined to exceed the channel variations threshold, an accelerated procedure is performed. Otherwise, a normal procedure is performed. The accelerated comprises predicting 906, at time instant t, i.e. "now", whether handover is likely to occur in connection with the next scheduled measurement instant t+τ based on the signal measurements. If handover is determined likely 908 from the prediction, the procedure directly proceeds with initiating a handover process, i.e. sends an initial measurement report request 910. The initial steps of a handover process will be further described below.

Figure 1:
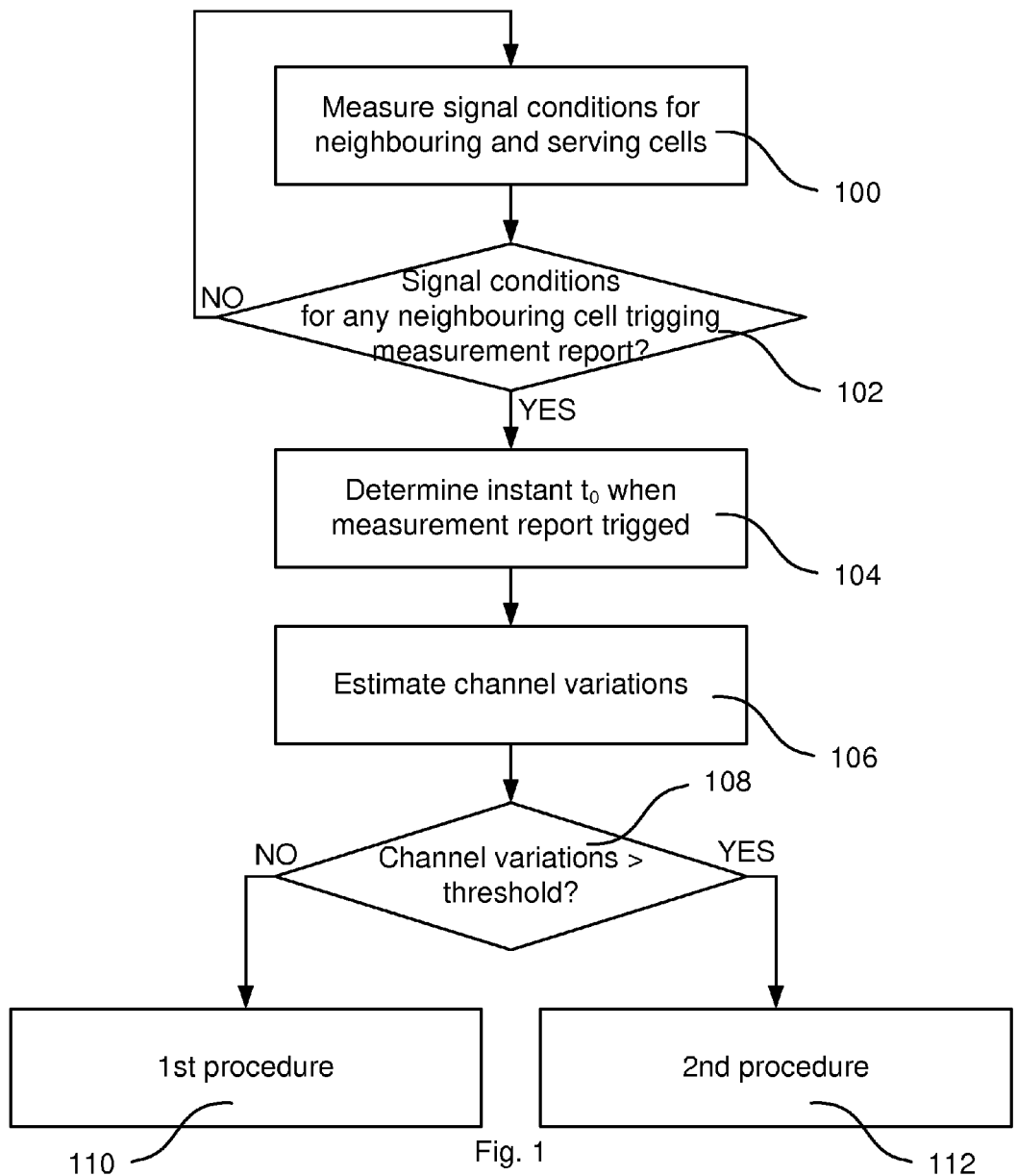
FIG. 1 is a flow chart schematically illustrating a method according to an embodiment.
Figure 7:
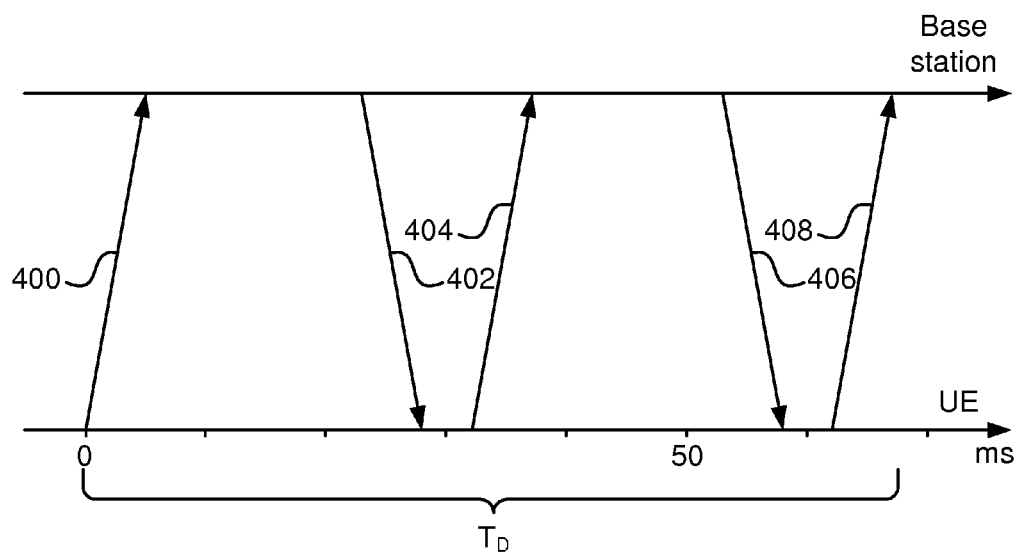
FIG. 7 schematically illustrates a timing diagram for an example of a procedure for preparing handover as of FIG. 4.

FIG. 1 is a flow chart schematically illustrating a method of decreasing radio link failure in challenging mobility scenarios for a user equipment, UE, device. The UE is working in a cellular telecommunication network with a base station of each cell, for example a 3GPP LTE network. Signal conditions for serving cell and neighbouring cells are measured 100. This is performed periodically, e.g. every 40 ms, and the measured values can be filtered and/or analysed to provide a value suitable for use in determination of channel conditions and channel variations. Signal conditions can be Reference Signal Received Power, RSRP, and/or Reference Signal Received Quality, RSRQ, or measures such as signal-to-noise ratio, SNR, signal-to-interference ratio, SIR. The determining of signal conditions also comprises cell searching to enable measuring the adequate signals. Signal conditions for respective cell are measured such that the conditions can be mutually compared, e.g. for making decision on handover. For that purpose, a defined instant called $t_0$ is determined 104 in the event signal condition for any of the neighbouring cells is determined 102 to be better than for the serving cell, preferably by a hysteresis threshold. A "timer" is started, i.e. time is checked, and during a predefined "time to trigger", TTT, the development of signal conditions are awaited before reporting such that handover decision can be made. This is for not overloading the system with signalling as soon as signal conditions go up and down due to non-substantial reasons. Thus, a filter with a size corresponding to the time of TTT can be used. An exemplary timing diagram is illustrated in FIG. 7, which example will be further elucidated below. However, as elucidated above, a combination of circumstances such as high speed of UE, fast changing signal conditions, and for example the fact that only hard handover is available in the used cellular communication can be fatal and a radio link failure can occur. Therefore, channel variation, e.g. UE speed and/or influence by obstacles in the environment, is estimated 106 and compared 108 with a threshold value such that, when speed is determined not to exceed a speed threshold, a first procedure, which can be considered as a "normal procedure" is performed 110. In the other case, e.g. when speed is determined to reach the speed threshold and/or channel variations have been considerable for a while, a second procedure, which can be considered as an "accelerated procedure", is performed 112. In accelerated procedure, a different filter size, i.e. shorter/smaller filter, can be used for achieving a more instant view of channel conditions and variations. The normal procedure, i.e. the first procedure, which is default and only procedure in previous art, roughly comprises determining an instant when signal condition for any of the neighbouring cells exceeds signal condition for serving cell by a hysteresis threshold. A time to trigger timer is started at that instant such that a next scheduled measurement instant is scheduled when a predetermined time to trigger period has elapsed on the time to trigger timer. Then the signal conditions are reconsidered when the next scheduled measurement instant occurs, and an initial measurement report request is sent to the base station of the serving cell. After a while, an initial scheduling grant is received from the base station of the serving cell. After reception of the initial scheduling grant, a buffer size transmission request is sent to the base station of the serving cell. After a while, an allocation scheduling grant is received from the base station of the serving cell for the requested size of transmission. Then, a measurement report based on the reconsidered signal conditions is sent to the base station such that the cellular telecommunication network is enabled to make a handover decision for the UE.

The analysis can comprise predicting signal conditions at least for one future time instant based on collected signal samples. The prediction can use statistical models known in the art, such as regression, using the collected signal samples as input. The determining of the likelihood of handover can then be determined from the predicted values, for example by comparing a predicted value or value set with a threshold for handover decision.

The first procedure is illustrated by the flow charts of FIG. 2 and FIG. 4. Reconsidering 200 of the signal conditions is performed when the next scheduled measurement instant occurs, i.e. when the TTT has lapsed from the instant $t_0$. The term "reconsider" means making a new or further analysis of collected measurement values. This can be made by for example applying a different filter to the collected measurement values, and/or apply trend analysis to collected measurement values. The reconsidering can be made in one or several steps for collected measurement values. A procedure of evaluating measurement report triggers and sending of a measurement report 202 is enabled after the reconsidering. An example of the procedure for measurement reporting 202 is further demonstrated with reference to FIG. 4 and FIG. 7 below.

Figure 3:
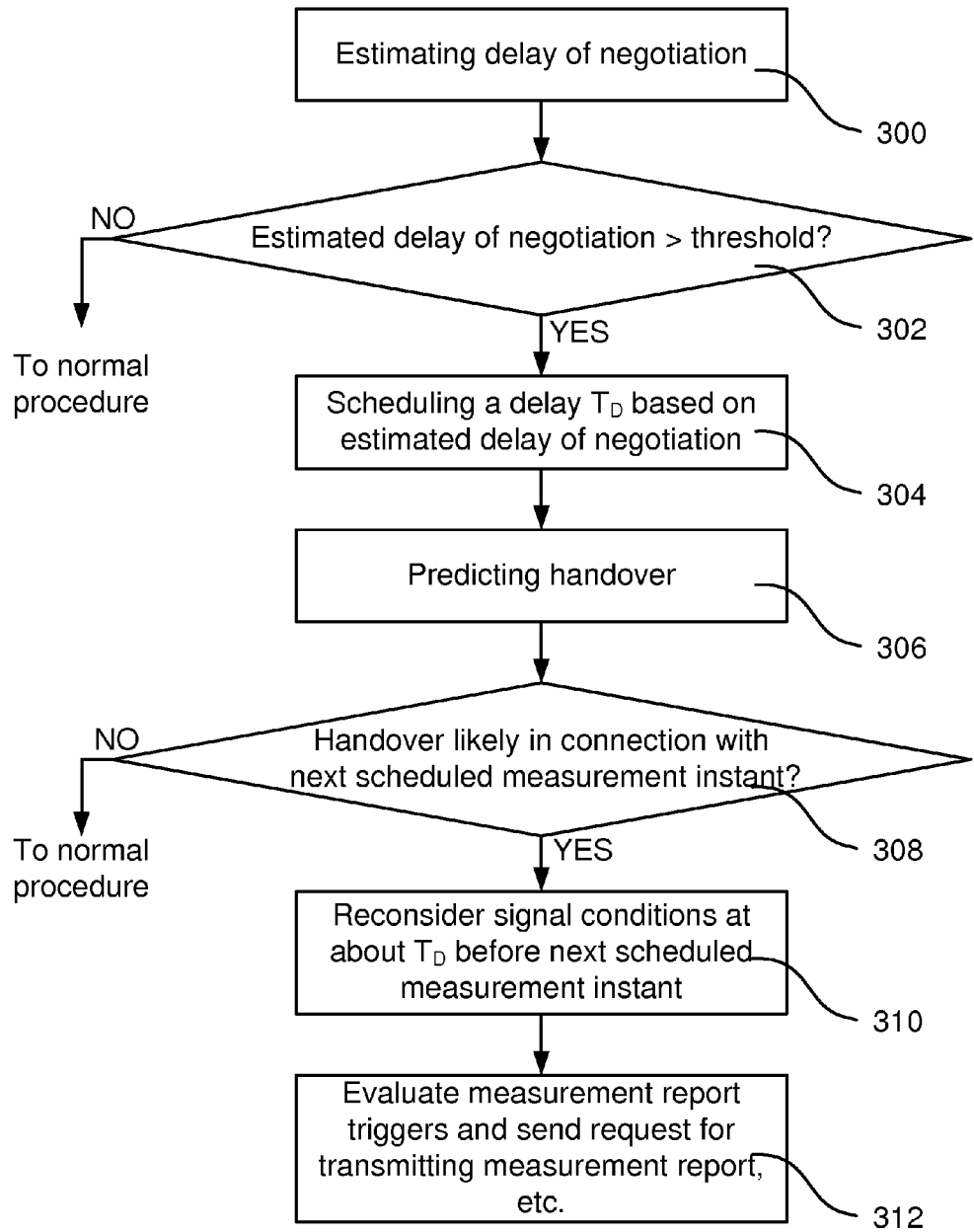
FIG. 3 is a flow chart illustrating an embodiment of the second procedure of FIG. 1.

The second procedure is illustrated by the flow chart on FIG. 3. An estimate $T_D$ of delay, as illustrated in FIG. 7, in negotiating transmission for measurement reporting is provided 300, e.g. based on previous signalling. If the estimated delay $T_D$ exceeds a threshold, it is determined 302 that normal procedure may be fatal and may risk radio link failure. If the delay does not reach the predetermined threshold, the normal procedure can be chosen 302. In case accelerated procedure is chosen, the delay $T_D$ is scheduled 304 such that a time $T_D$ before the TTT will elapse, an accelerated procedure measurement instant is scheduled. For avoiding unnecessary signalling, the likelihood of handover at next ordinary scheduled measurement report is predicted 306. This can be made based on trend analysis, other measurements, etc. If it is found 308 that the likelihood is low, the procedure can return to normal, but if it is found 308 likely that a handover event is going to occur at next scheduled instant, the signal conditions are reconsidered 310 at the scheduled accelerated procedure measurement instant, i.e. $T_D$ before TTT will elapse, and a procedure of evaluating measurement report triggers, negotiating transmission capacity and, after negotiation is settled, sending of a measurement report 312 is enabled after the reconsidering. An example of the procedure for measurement reporting 312 is further demonstrated with reference to FIG. 4 below.

FIG. 4 is a flow chart illustrating an example in the case of 3GPP LTE of the negotiation and sending of measurement report process of FIGS. 2 and 3. FIG. 7 illustrates an example of a corresponding timing diagram, where corresponding reference numerals for actions as of FIG. 4 are used. First, there is sending 400 an initial measurement report request to the base station of the serving cell, then, normally after about 10 to 30 ms, but minimum 4 ms, reception 402 of an initial scheduling grant from the base station of the serving cell is possible. After reception 402 of the initial scheduling grant, the UE sends 404, after 4 ms, a buffer size transmission request to the base station of the serving cell. Then, normally after about 10 to 30 ms, but minimum 4 ms, reception 406 of an allocation scheduling grant from the base station of the serving cell for the requested size of transmission is possible. The UE can then, after 4 ms, send 408 a measurement report based on the reconsidered signal conditions such that the cellular telecommunication network is enabled to make a handover decision for the UE. Summing up the delays, we can see that in a fast changing signal environment the handover may start too late if waiting to the normal scheduled instant and a radio link failure would occur, which in case of for example a voice over internet protocol service would be experience as an interrupted call.

With reference to FIGS. 1 to 4, the basics of working embodiments have been demonstrated. Many of the isolated features are familiar to the skilled person, and are therefore not described in great detail. However, some of the features have been found by the inventors to further improve fighting the radio link failures upon particular application or modification, and will be demonstrated below.

The predicting 306 of whether handover is likely to occur in connection with the next scheduled measurement instant can be performed by determining a likelihood for signal condition for any of the neighbouring cells to further exceed signal condition for serving cell, and determining a threshold for likelihood for signal condition for any of the neighbouring cells to further exceed signal condition for serving cell for handover to be predicted. From this, the determining of the likelihood can comprise making a trend analysis based on previous measurements of signal conditions. Filtering of samples of signal conditions for providing a reliable measurement report is an approach that may be used. In such a case, the determining of the likelihood can comprise making a similar filtering, but with a decreased filter constant for collecting signal samples during a period between measurement reports, i.e. a faster filter. Thereby can a development of the signal conditions be determined. Further, the determining of the threshold for likelihood can comprise decreasing the threshold from a default value in relation to the scheduled delay $T_D$, i.e. if the system is estimated to be slow on scheduling grant for reporting, the threshold is decreased such that the UE is a little more "cautious" when working in the slow system compared to when knowing that it works in a knowingly fast system.

The estimating of the speed of the UE can be made for other purposes already, wherein the estimate already may be present. The estimating can for example comprise determining Doppler shift, analysing signal strength shifts of a fading channel, etc. In any way of estimating the speed, the estimated speed renders a value that is compared to a corresponding value of the speed threshold, i.e. the speed need not be expressed in km per hour or meter per second, and can as good be expressed in any value directly obtainable by the measurement method. Signal conditions of course varies faster as speed increases. For low speed, this is manageable by other mechanisms, but when speed reaches about 25 to 30 m/s, the effect will be noticeable in performance in heavily loaded cells, and when exceeding 30 m/s and even more, problems may occur, especially in loaded cells. An example of a suitable value of the speed threshold for any cell can preferably corresponds to a speed of about 33 m/s, which has been found to be a speed where the risk of radio link failure seems to be really increase when this speed is reached or exceeded.

A way of estimating the scheduled delay $T_D$ can be to calculate it based on actual time difference between instant of transmitting initial scheduling request and instant of transmission of measurement report of previous measurement report or reports.

Figure 8:
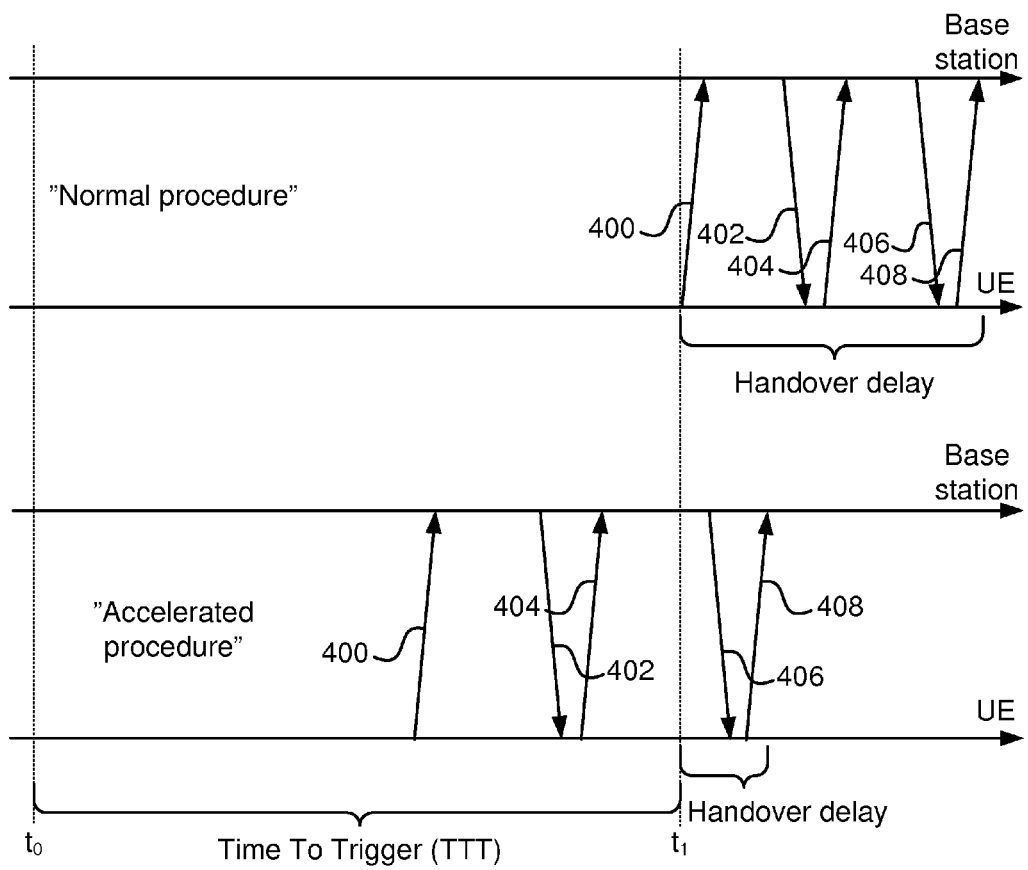
FIG. 8 schematically illustrates timing diagrams for comparison between first and second procedures as of FIG. 1.

FIG. 8 schematically illustrates timing diagrams for comparison between first and second procedures as of FIG. 1, i.e. "normal procedure" and "accelerated procedure", respectively. Reference numerals as of the actions described with reference to FIG. 4 are also used here. In the first procedure, the scheduled Time To Trigger (TTT) is used for determining when a possible request for transmission of a measurement report should be sent. This is what can be considered as normal procedure and is applied in previous art. This gives a handover delay, here considered from the normal measurement report trigger time instant, that equals the time from sending the initial request for transmission of a measurement report. In the second procedure, on the other hand, an accelerated approach is used when needed, as elucidated with reference to FIG. 1, where the initial request for transmission of a measurement report is sent directly when handover is determined to be likely. Thus, as can be seen in FIG. 8, the handover delay is significantly reduced, and risk of radio link failure in the quickly varying channel environment is also reduced. In the illustration of the accelerated procedure, i.e. the second procedure, an example where the delay $T_D$ is increased for example due to high load on cell is illustrated to further emphasize advantage of the accelerated procedure in such a case. Therefore, the determination of which procedure to use can also take the load of the cell, e.g. by estimated delay $T_D$, into account.

The method has been described as a number of action steps for the sake of easier understanding. The action steps should not be construed to only be made sequentially in the order described. Instead, the actions of the method can work in parallel and are not limited in any other sense than due to input of values, decisions or parameters from other actions.

Figure 5:
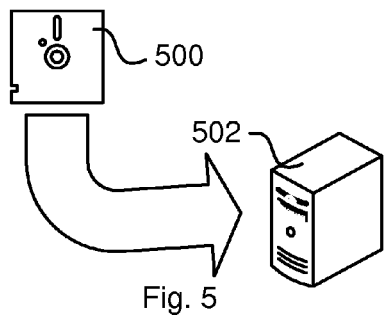
FIG. 5 schematically illustrates a computer readable medium comprising a computer program to be loaded into a processing device.

The method as demonstrated above is suitable for implementation with aid of processing means, such as computers and/or processors. Therefore, there is provided computer programs, comprising instructions arranged to cause the processing means, processor, or computer to perform the steps of any of the methods according to any of the embodiments described with reference to FIGS. 1 to 4. The computer programs preferably comprises program code which is stored on a computer readable medium 500, as illustrated in FIG. 5, which can be loaded and executed by a processing means, processor, or computer 502 to cause it to perform the methods, respectively, according to embodiments of the present invention, preferably as any of the embodiments described with reference to FIGS. 1 to 4. The computer 502 and computer program product 500 can be arranged to execute the program code sequentially where actions of the any of the methods are performed stepwise. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

Figure 6:
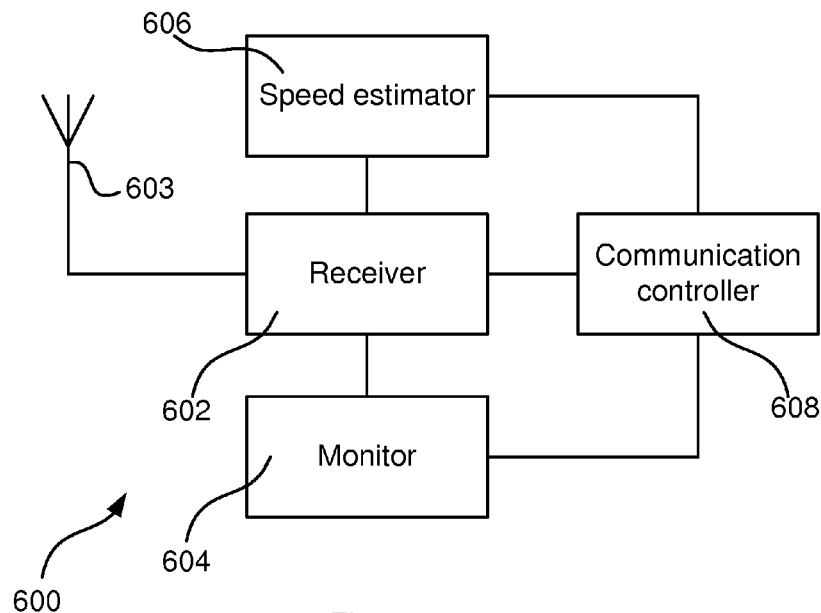
FIG. 6 is a block diagram schematically illustrating elements of particular interest for this disclosure of a user equipment device, and among those elements a communication controller.

FIG. 6 is a block diagram schematically illustrating elements of particular interest for this disclosure of a user equipment, UE, device 600. The UE device can comprise a multitude of other elements, such as a user interface, audio circuitry, input and output interfaces for interacting with other equipment, etc. However, as these elements are not involved in the particulars of the invention disclosed herein, they have been omitted not to obscure the relevant parts as the skilled person would readily know how to add such elements for making a UE device. The UE device 600 is suitable for working in a cellular telecommunication network with a base station of each cell, e.g. a 3GPP LTE telecommunication network. The UE 600 comprises a transceiver 602 arranged to receive signals from and transmit signals to at least one of the base stations in vicinity of the UE device 600, e.g. via an antenna or antenna system 603, when used in the telecommunication network. The transceiver is connected to a monitor 604 such that the monitor 604 can be provided with received signals or signals processed therefrom. The monitor 604 is arranged to measure signal conditions for serving cell and neighbouring cells based on signals received by the transceiver 602. The monitor 604 can be integrated in the transceiver 602, or be a separate element, i.e. a separate chip. A speed estimator 606 is connected to the transceiver 602 and is arranged to estimate speed of the UE based on signals received by the transceiver 602. The speed estimator 606 can be integrated in the transceiver 602, or be a separate element, i.e. a separate chip. A communication controller 608 is connected to the receiver 602, the monitor 604, and the speed estimator 606 such that it can be arranged to perform the approach which has been demonstrated above for the method. The controller 608 is preferably implemented as a processor or signal processor, and the monitor 604 and/or the speed estimator 606 can be part of the controller 608. The controller 608 receives information from the receiver 602, the monitor 604, and the speed estimator 606 and also provides control signals to them.

The monitor 604 can be arranged to determine Reference Signal Received Power, RSRP, and/or Reference Signal Received Quality, RSRQ, for the respective cells. The monitor also comprises a cell searcher arranged to make cell search such that measurements can be made on the relevant signals.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of decreasing radio link failure in mobility scenarios for a user equipment (UE) device working in a cellular telecommunication network with a base station of each cell, the method comprising:
    periodically measuring signal conditions for serving cell and neighboring cells;
    estimating channel variations; and
    comparing the estimated channel variations with a threshold value; and,
    when channel variations are determined to exceed a channel variations threshold, performing an accelerated procedure that comprises predicting whether handover is likely to occur when the next scheduled measurement instant occurs, based on the signal measurements, and, when handover is predicted, directly proceeding with sending an initial measurement report request.

2. The method of claim 1, further comprising, upon directly proceeding with sending the initial measurement report request:
    reconsidering the signal conditions regardless of when the next scheduled measurement instant occurs;
    sending the initial measurement report request to the base station of the serving cell;
    receiving an initial scheduling grant from the base station of the serving cell;
    after reception of the initial scheduling grant, sending a buffer size transmission request to the base station of the serving cell;
    receiving an allocation scheduling grant from the base station of the serving cell for the requested size of transmission; and
    sending a measurement report based on the reconsidered signal conditions as soon as possible after the next scheduled measurement instant occurs, such that the cellular telecommunication network is enabled to make a handover decision for the UE device.

3. The method of claim 1, wherein said estimating of channel variations comprises estimating the speed of the UE device, and wherein said comparing the estimated channel variations with a threshold value comprises comparing the estimated speed of the UE device with a threshold speed.

4. The method of claim 1, wherein a decision whether to perform the accelerated procedure further comprises:
    estimating a delay comprising an estimated time difference between an instant of transmitting initial scheduling request and an instant of transmission of measurement report; and
    comparing the estimated delay with a threshold, wherein the decision is weighted towards a decision to perform the accelerated procedure if the estimated delay exceeds the threshold.

5. The method of claim 1, wherein said measuring of the signal conditions for serving cell and neighboring cells comprises making a cell search and determining Reference Signal Received Power (RSRP) or Reference Signal Received Quality (RSRQ), or both, for respective cells.

6. The method of claim 1, wherein said predicting of whether handover is likely to occur in connection with the next scheduled measurement instant comprises:
    determining a likelihood for signal condition for any of the neighboring cells to further exceed signal condition for serving cell; and
    determining a threshold for likelihood for signal condition for any of the neighboring cells to further exceed signal condition for serving cell for handover to be predicted.

7. The method of claim 6, wherein said determining of the likelihood comprises making a trend analysis based on previous measurements of signal conditions.

8. The method of claim 6, wherein said determining of the likelihood comprises decreasing a filter constant for collecting signal samples during a period between measurement reports, such that a more instant view of channel conditions and variations is achieved.

9. The method according to claim 6, further comprising predicting signal conditions at least for one future time instant based on collected signal samples, wherein the determining of the likelihood takes the predicted signal conditions into account.

10. The method of claim 1, wherein said estimating of channel variations includes any of:
    estimating the speed of the UE by any of determining Doppler shift and analyzing signal strength shifts of fading channel; and
    analyzing signal conditions for abrupt changes during a time window.

11. A user equipment (UE) device adapted for working in a cellular telecommunication network with a base station of each cell, the UE device comprising:
    a transceiver arranged to receive signals from and transmit signals to at least one of the base stations in vicinity of the UE device when in use;
    a monitor arranged to measure signal conditions periodically for serving cell and neighboring cells based on signals received by the transceiver; and
    a communication controller arranged to:
        estimate channel variations from the measured signal conditions;
        compare the estimated channel variations with a threshold value; and,
        when the estimated channel variations are determined to exceed a channel variations threshold, performing an accelerated procedure that comprises predicting whether handover is likely to occur when the next scheduled measurement instant occurs, based on the signal measurements, and, when handover is predicted, directly proceeding with initiating a handover process.

12. The UE device of claim 11, wherein the communication controller, upon predicting whether handover is likely to occur in connection with the next scheduled measurement instant, is further arranged to:
   determine a likelihood for signal condition for any of the neighboring cells to further exceed signal condition for serving cell; and
   determine a threshold for likelihood for signal condition for any of the neighboring cells to further exceed signal condition for serving cell for handover to be predicted.

13. The UE device of claim 12, wherein the communication controller, upon determination of the likelihood, is further arranged to perform a trend analysis based on previous measurements of signal conditions.

14. The UE device of claim 12, wherein the communication controller, upon determination of the likelihood, is further arranged to apply a decreased filter constant for collection of signal samples during a period between measurement report, such that a more instant view of channel conditions and variations is achieved.

15. A non-transitory computer-readable medium comprising computer program code stored thereon, the computer program code comprising instructions to cause a processor on which the computer program code is executed to perform the method of claim 1.

* * * * *